United States Patent [19]

Yagi et al.

[11] 3,919,985

[45] Nov. 18, 1975

[54] VARIABLE SIZE TORCH NOZZLE FOR INTERNAL COMBUSTION ENGINE

[75] Inventors: Shizuo Yagi, Asaka; Yasuhito Sato, Kamifukuoka; Kiyoshi Miyaki, Asaka, all of Japan

[73] Assignee: Honda Giken Kogyo Kabushiki Kaisha, Tokyo, Japan

[22] Filed: Jan. 21, 1974

[21] Appl. No.: 434,916

[30] Foreign Application Priority Data
Feb. 14, 1973   Japan.................................. 48-17421

[52] U.S. Cl...... 123/32 SP; 123/75 B; 123/188 AF; 123/33 VC
[51] Int. Cl.²..................... F02B 19/10; F02B 19/16
[58] Field of Search.......... 123/33 VC, 75 B, 32 ST, 123/32 SP, 191 S, 191 SP, 188 AF; 137/625.17, 614.18

[56] References Cited
UNITED STATES PATENTS

| | | | |
|---|---|---|---|
| 1,550,104 | 8/1925 | Schwer............................ | 123/33 VC |
| 2,198,979 | 4/1940 | Schwaiger....................... | 123/33 VC |
| 3,830,205 | 8/1974 | Date................................ | 123/32 ST |

*Primary Examiner*—Wendell E. Burns
*Assistant Examiner*—Ronald B. Cox
*Attorney, Agent, or Firm*—Lyon & Lyon

[57] ABSTRACT

A three-valve spark-ignition internal combustion piston engine has an auxiliary chamber connected to each main combustion chamber through a torch nozzle. The intake valve for the auxiliary chamber is provided with an apertured skirt for varying the effective size of the torch nozzle under turning movement of the intake valve stem, controlled by intake vacuum pressure of the engine.

4 Claims, 4 Drawing Figures

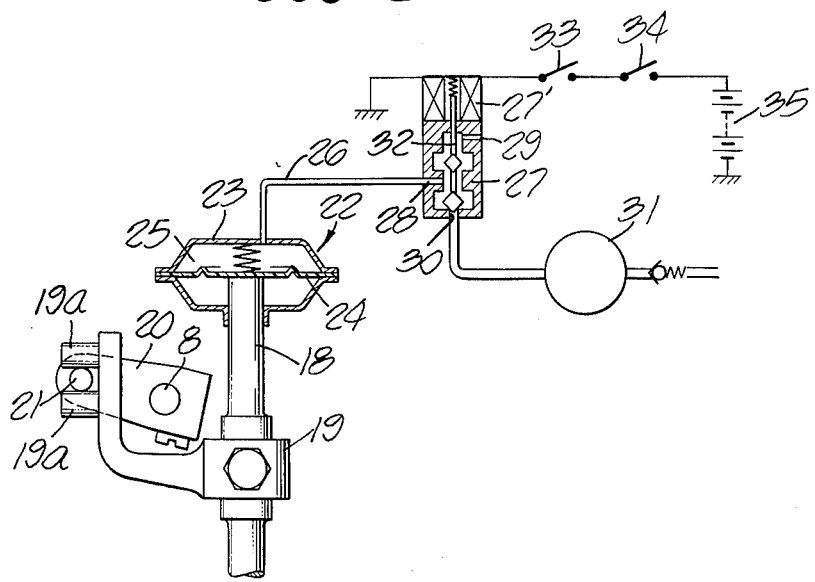

VARIABLE SIZE TORCH NOZZLE FOR INTERNAL COMBUSTION ENGINE

This invention relates to internal combustion piston engines of the type having one or more main combustion chambers each connected by means of a torch nozzle to an auxiliary combustion chamber, respectively. A rich mixture supplied to the auxiliary combustion chamber is spark-ignited to provide a flame which is projected through the torch nozzle to burn a relatively lean mixture in the main combustion chamber. Each main chamber is provided with an intake valve and an exhaust valve and each auxiliary chamber is provided with an intake valve. Accordingly, engines of this type are known as three-valve engines. The valves are opened and closed in timed sequence by conventional cam mechanisms.

The three-valve engine of this invention provides a means for varying the effective size of the torch nozzle connecting the auxiliary chamber to the main chamber, in order to minimize objectionable emissions such as unburned hydrocarbons and oxides of nitrogen in the engine exhaust gases. The ability to vary the effective size of the torch nozzle in accordance with operating conditions of the engine improves the scavenging efficiency and ingnitability of the fuel mixture at all times over the operating range of low load to high load of the engine, and on a lean mixture of air and fuel.

More particularly, the apparatus for varying the effective size of the torch nozzle comprises a plate or skirt fixed to the auxiliary intake valve for the auxiliary combustion chamber. The skirt contains an aperture which may be brought into or out of alignment with the torch nozzle by turning movement of the auxiliary intake valve. This turning movement is accomplished by parts acting on the exposed stem of that valve, and controlled by engine vacuum pressure.

Other and more detailed objects and advantages will appear hereinafter.

In the drawings:

FIG. 2 is a plan view in diagrammatic form of the mechanism for rotating the stem of the auxiliary intake valve to vary the effective size of the torch nozzle.

FIG. 3 is a sectional view taken on the lines 3—3 as shown in FIG. 1.

FIG. 4 is a view similar to FIG. 3 showing the parts in another position.

Figure 1:
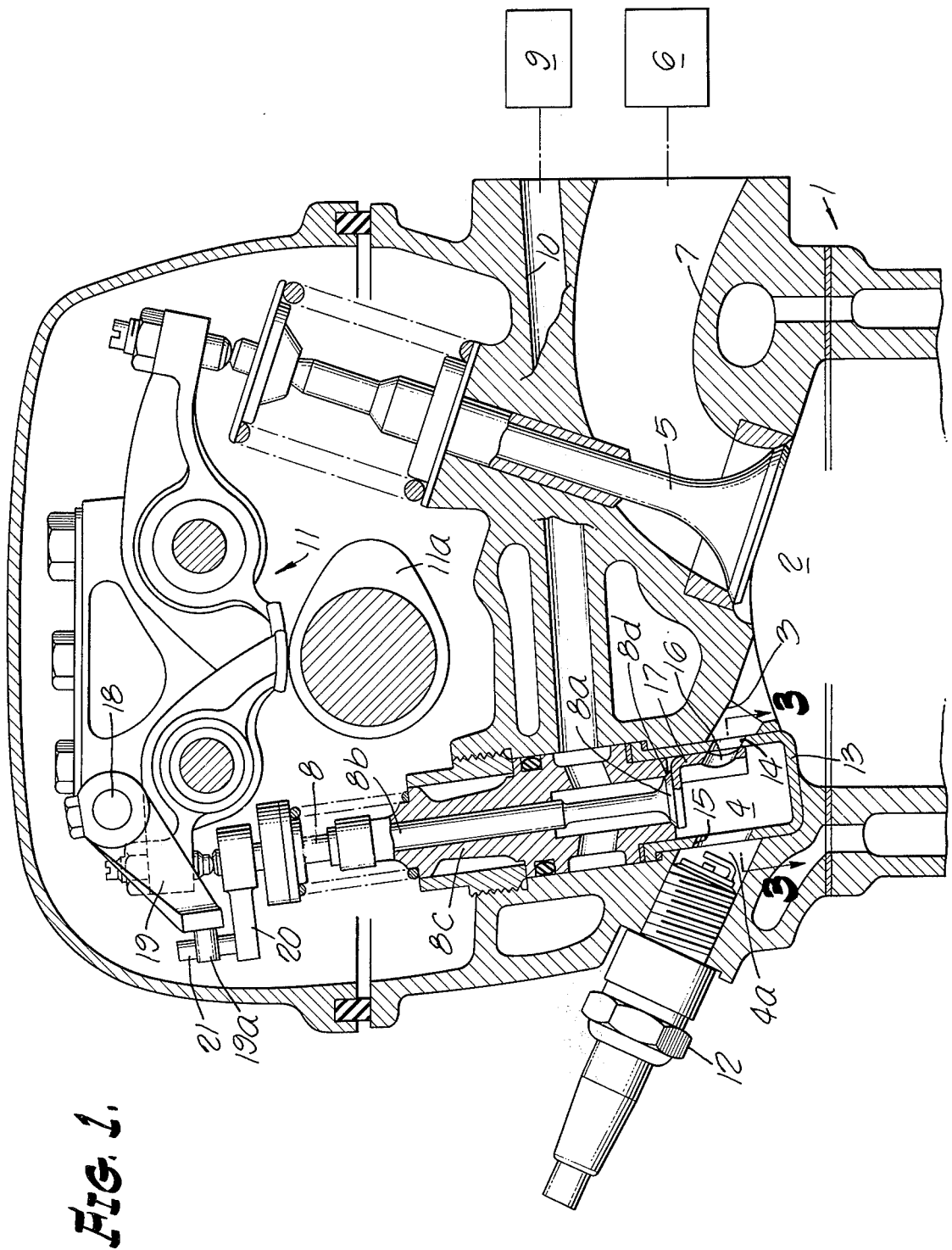
FIG. 1 is a sectional side elevation showing a preferred embodiment of this invention.

Referring to the drawings, the internal combustion piston engine 1 has a main combustion chamber 2, one wall thereof being formed by a piston, not shown. An opening 3 formed in the engine head communicates with an auxiliary combustion chamber 4. The main intake valve 5 admits a lean air-fuel mixture to the main combustion chamber 2 from the first carburetor 6 by way of the intake passage 7. A conventional exhaust valve, not shown, is provided for the main combustion chamber 2.

The auxiliary intake valve 8 controls the flow of rich air-fuel mixture from carburetor 9 through inlet passage 10 to the auxiliary chamber 4. Mechanism 11 operated by cam 11a closes the main intake valve 5 and the auxiliary intake valve 8. The exhaust valve, not shown, is also operated by cam mechanism in a conventional manner.

The stationary cup 13 is mounted in the engine head and has a first opening 14 aligned with the opening 3 and a second opening 15 communicating with a chamber 4a containing the electrodes of the spark plug 12. A plate or skirt 17 is fixed to the head 8a of the auxiliary intake valve 8 and extends into the interior of the cup 13. The skirt 17 has a curved outer surface to contact the inner surface of the cup 13. The skirt 17 has an aperture 16 which may be moved to a position of alignment with the openings 3 and 14 as shown in FIG. 3, or which may be turned for partial misalignment as shown in FIG. 4. When the parts are in a position shown in FIG. 3, the effective size of the torch nozzle restriction 14, 3 is not diminished. However, when the parts are in the position shown in FIG. 4, the effective size of the torch nozzle restriction is reduced.

Above the auxiliary intake valve 8 a cross shaft 18 is supported by the cylinder head so as to slide axially, and a bent arm 19 is fixed to this cross shaft. An arm 20 fixed to the upper end of the stem 8b of the auxiliary intake valve 8 carries an upstanding pin 21 which is received between lugs 19a carried at the outer end of the bent arm 19. From this description it will be understood that axial movement of the cross shaft 18 serves to turn the auxiliary intake valve 8 within its guide bushing 8c and thereby swing the skirt 17 between the positions shown in FIG. 3 and FIG. 4, and thereby vary the effective size of the torch nozzle restriction.

As shown in FIG. 2, the load detecting device generally designated 22 includes a case 23 and a flexible diaphragm 24, the latter being connected within the case 23 to the cross shaft 18 and also dividing the case 23 to form a vacuum chamber 25. A vacuum pipe 26 connected to the chamber 25 is also connected to a port 28, one of three ports of a three-way solenoid valve 27. The second port 29 is connected to atmosphere and the third port 30 connects through accumulator 31 to the main intake passage 7 downstream from the carburetor throttle valve. The electrical coil 27' for the solenoid valve 27 is connected to a power source 35 through a first switch 33 and a second switch 34. The first switch 33 is sensitive to speed of the internal combustion engine and the second switch 34 moves in response to movement of the throttle valve of the carburetor 6.

As the engine load increases to open both the first and second switches 33 and 34, the solenoid coil 27' is de-energized and the valve rod 32 closes the port 30 so that the atmosphere acts on the vacuum chamber 25 to move the cross shaft as the chamber 25 expands. This causes counterclockwise movement of the arm 20 and intake valve 8, as viewed in FIG. 2, thus reducing the effective opening of the torch nozzle restriction, as shown in FIG. 4. As the engine load decreases to close both the first and second switches 33 and 34, the coil 27' is energized to retract the valve rod 32 to close the port 29 and open the port 30, so that intake vacuum acts on the vacuum chamber 25 to retract the cross shaft 18. This movement of the cross shaft 18 is reflected through parts 19 and 20 to turn the intake valve 8 in a clockwise direction as viewed in FIG. 2, thereby moving the skirt 17 to the unrestricted position shown in FIG. 3.

During the intake stroke of the piston, both the main intake valve 5 and the auxiliary intake valve 8 are opened so that a charge of lean mixture from the main carburetor 6 is taken into the main combustion chamber 2 while a charge of rich mixture from the auxiliary carburetor 9 is drawn into the auxiliary combustion chamber 4. At the end of the compression stroke, spark plug 12 is fired to ignite the mixture in the auxiliary combustion chamber 4, and a flame is projected from the torch nozzle into the main combustion chamber 2 to burn the lean mixture therein. In this way the internal combustion engine is operated on a lean overall air-fuel ratio.

When the engine is operating under low load conditions, the intake vacuum acts on the vacuum chamber 25 of the load detecting device 22 to turn the auxiliary intake valve 8 toward the position shown in FIG. 3, with the torch nozzle opening unrestricted by the opening 16 in the skirt 17. Accordingly, residual gas in the auxiliary combustion chamber 4 may flow out into the main combustion chamber 2 during the intake stroke. Scavenging of the auxiliary combustion chamber 4 is thus improved, and the chamber 4 is filled with a fresh charge which may be readily ignited by the spark plug 12.

When the internal combustion engine is operating under a high load condition, the atmosphere acts on the vacuum chamber 25 of the load detecting device 22 to turn the auxiliary intake valve 8 toward the position shown in FIG. 4, in which the torch nozzle opening is restricted. During the compression stroke, the flow of air-fuel mixture from the main combustion chamber 2 to the auxiliary combustion chamber 4 is restricted and this acts to prevent the formation of a vortex in the auxiliary chamber 4. In this way the flame cone produced therein is prevented from being blown out and this assures ignition and combustion for the mixture in the auxiliary combustion chamber 4.

During the intake stroke the torch nozzle is restricted but scavenging is not adversely affected to any material extent because of the greater volume of mixture inducted. The size of the torch nozzle 14, 3 is chosen so that it allows the required flow of mixture even when the auxiliary intake valve head 8a is depressed away from seat 8d to open position.

This invention makes it possible to change the effective size of the torch nozzle 3 by rotation of the auxiliary intake valve 8. Thus, by virtue of adjustment of the effective size of the torch nozzle restriction, ignitability of the mixture in the auxiliary chamber by a spark plug is improved whether the engine is operating under a high load or a low load, and the engine may operate at all times on an overall lean air-fuel mixture.

The construction described in which the device for varying the effective size of the torch nozzle restriction comprises an apertured skirt fixed to the head of the auxiliary intake valve avoids the necessity of extending an extra operating part into the auxiliary combustion chamber 4. Not only is the construction simplified but also the auxiliary combustion chamber 4 is not adversely affected in air tightness by the presence of a separate adjustment mechanism for the torch nozzle 3, since the auxiliary combustion chamber 4 is assured of air tightness by contact between the seat 8d and the head 8a of the auxiliary intake valve 8.

Having fully described our invention it is to be understood that we are not to be limited to the details herein set forth but that our invention is of the full scope of the appended claims.

We claim:

1. In a spark-ignition internal combustion piston engine having a main combustion chamber and an auxiliary combustion chamber connected by a torch nozzle, and having means including a first intake passage for delivering a lean mixture to the main chamber and means including a second intake passage for delivering a rich mixture to the auxiliary chamber, the improvement comprising, in combination: an auxiliary intake valve assembly positioned to control flow through the second intake passage into the auxiliary chamber, said intake valve assembly having a movable valve element, a skirt on said movable valve element extending into said auxiliary chamber near the torch nozzle, means for moving said valve element axially to open and close said intake valve assembly, and means for turning said movable valve element to cause the skirt to vary the effective size of the torch nozzle.

2. The combination set forth in claim 1 in which the latter said means is responsive to vacuum pressure in said first intake passage.

3. In a spark-ignition internal combustion piston engine having a main combustion chamber and an auxiliary combustion chamber connected by a torch nozzle, and having means including a first intake passage for delivering a lean mixture to the main chamber and means including a second intake passage for delivering a rich mixture to the auxiliary chamber, the improvement comprising, in combination: an auxiliary intake valve assembly positioned to control flow through the second intake passage into the auxiliary chamber, said intake valve assembly having a stationary seat and having a stem provided with an enlarged head for closing axially against the seat, a skirt on the enlarged head projecting away from said stem and into said auxiliary chamber near the torch nozzle, means including a cam for moving the stem axially to open and close the valve head with respect to the stationary seat, and means for turning the stem to cause the skirt to vary the effective size of the torch nozzle.

4. The method of operating an internal combustion piston engine having a main combustion chamber and an auxiliary combustion chamber connected by a torch nozzle, comprising the steps of: delivering a lean air-fuel mixture to the main chamber, delivering a rich air-fuel mixture to the auxiliary chamber, spark-igniting the mixture in the auxiliary chamber to project a flame through the torch nozzle into the main chamber, cyclically controlling the flow of rich air-fuel mixture into the auxiliary chamber, and reducing the effective size of the torch nozzle as the engine load increases.

* * * * *